United States Patent Office 2,807,202
Patented Sept. 24, 1957

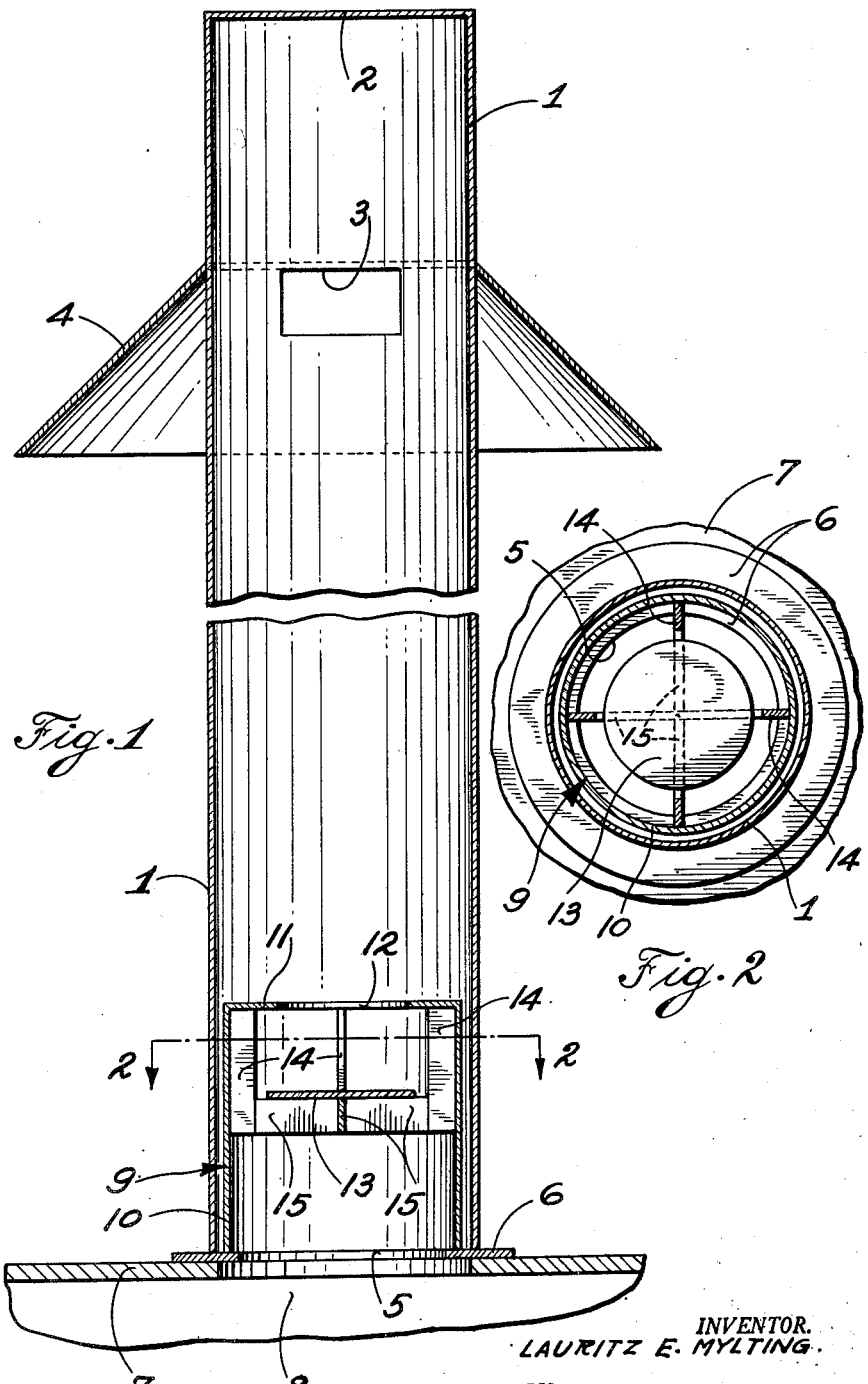

2,807,202

SNUBBER VENT FOR A STORAGE SILO

Lauritz E. Mylting, Ardmore, Pa., assignor to The Allen-Sherman-Hoff Company, Wynnewood, Pa., a corporation of Pennsylvania Application August 18, 1955, Serial No. 529,264

5 Claims. (Cl. 98—54)

This invention relates generally to the art of venting storage chambers and is particularly concerned with a new stack type vent in which a piston is movable in response to varying gas pressures within the chamber.

It has been common heretofore to vent storage chambers by enclosing an outlet for the chamber in a bag-like filter. For example, in the storage of fine solids, such as cement, pipe-like outlets from the upper part of the chamber are provided with bag filters which are intended to permit gases to pass out of the chamber and to retain the solids. When the solids are discharged into the chamber in heated form and with a considerable volume of hot gases, the gases within the chamber are heated and expanded and such expansion together with the surge of the heated gases into the chamber cause a sudden flow of gases and solids into the vent. Some of the solids collect on the inside of the bag filter and partially stop up the interstices through which the gases may flow. When the discharge of solids into the chamber ceases, or the gas pressure or volume in the chamber decreases, outside air is drawn through the filter. Since the air usually contains more or less moisture, the soilds clinging to the inside of the filter are moistened and adhere to the filter. In this manner the solids cake on the filter and soon make it necessary for the filters to be changed or for the solids to be removed therefrom.

The present invention aims to avoid these and many other well known disadvantages of the bag filter vents and achieves this aim by providing a vent which is of simple construction, may be composed entirely of metal and will not require any attention over long periods of time.

The present invention will be better understood by those skilled in the art from the following specification and the drawings which accompany and form a part thereof and in which:

Fig. 1 is a vertical central sectional view of one form of apparatus embodying the present invention; and Fig. 2 is a sectional view taken on line 2—2 of Fig. 1.

Fig. 1 shows a vertical cylindrical meal tube or stack 1 which is closed at the top as indicated at 2, has an outlet 3 near the upper end, has a conical, rain-deflecting shield 4 attached to the outside thereof above opening 3 and extending downwardly and outwardly therepast, and has an opening 5 at its lower end. The stack 1 rests on a plate 6 which may constitute a part of a storage bin or silo 7 and has a central hole connecting the interior of the storage chamber 8 with the interior of the stack.

A piston 9 is disposed within stack 1 and normally rests on plate 6. This piston comprises a cylindrical body 10 having an outside diameter slightly less than the inside diameter of pipe 1 so that the piston may be moved freely lengthwise of the latter. The upper end 11 of piston 10 is provided with an aperture 12 and a disc 13 which is movably mounted in the piston, has a diameter larger than that of the aperture, and serves to close aperture 12 against the flow of gases therethrough when moved up against the top wall 11 of the piston. Disc 13 is supported and guided in the piston by two flat plates 14, positioned on diameters at right angles to each other, attached to the piston and cut away from the upper ends to adjacent their lower ends, as indicated at 15, to afford support for the lower side of disc 13 and guides for the edges of the disc.

The operation of the apparatus of Figs. 1 and 2 is substantially as follows:

When the gas pressures are the same inside and outside of the storage chamber 8, the piston 9 and disc 13 will be in the positions shown in Fig. 1. If a quantity of solids and gases is suddenly discharged into the storage chamber the space for gases in the chamber will be decreased and the volume within the chamber will be increased by the incoming gas and by expansion of the gases if the incoming gas or solids are heated. As a result of one or more of these conditions, the gases will flow into the stack 2 and when the flow is in large enough volume the disc 13 will first be moved into position against the head 11 of piston 9 with resultant closing of aperture 12, and then the piston and disc will be moved upwardly in pipe 1 as far as is necessary to accommodate the volume of the incoming gases and solids and the surging effect of their discharge into the storage chamber, while gases in small volume may escape through the space between the piston and the stack. In the event that this increase in volume is sufficient to move the piston 9 to a position above opening 3 gases may escape directly through that opening and may carry some of the solids with them.

When the fluid pressure within the chamber decreases piston 9 will move downwardly in pipe 1; and when the fluid pressure exerted on disc 13 becomes less than the force of gravity acting on the disc, or when the piston strikes the plate 6 at the bottom of pipe 1 with some force, disc 13 will be moved down onto supports 15 of guides 14, thereby opening the interior of the storage chamber to the atmosphere by way of the passage through piston 9 around disc 13 and through opening 3.

Since the pipe or stack 1 may be made in any desired size, for example, two feet in diameter and fifteen feet high, it may be made to accommodate a wide range of increases in gaseous volume in the storage chamber before gases can escape directly through opening 3. In this manner substantially no solids will escape from the storage chamber during all normal operations of the vent. Thus opening 3 need be used for the direct escape of gases and solids only in the exceptional instances where an unusually large increase in gaseous volume occurs.

From the foregoing description it will be understood that practically no attention is required to keep the snubber vent of this invention in constant operation; and that no substantial discharge of solids from the vent will occur except in rare and unusual cases where unexpectedly large increases in the gaseous volume in the storage chamber occur.

Having thus described the present invention so that others skilled in the art may be able to understand and practice the same, I state that what I desire to secure by Letters Patent is defined in what is claimed.

What is claimed is:

1. A snubber vent for a storage chamber comprising a member defining a top opening from said chamber, a cylindrical, vertical pipe open at the bottom and resting on said member about said opening, closed at the top and having an opening through its side near its upper end, a conical shield secured to the pipe above, and extending downwardly past, said side opening, a cylindrical piston having an opening in its top and an open lower end normally engaging said member within said pipe and around the opening from the chamber, the inner surface of the pipe and the outer surface of the piston defining therebetween an annular space having a short radial length as compared with its axial length, the axial length of the piston being less than the distance from the bottom of the side opening to the top of the pipe, a disc in the piston and movable to close said opening in the top thereof and plates extending lengthwise and transversely in the piston to support the disc remote from the top of the piston and to guide the disc in its movements toward and away from the piston top.

2. A snubber vent for a storage chamber comprising a member defining a top opening from said chamber, a tubular, vertical pipe open at the bottom and resting on said member about said opening, closed at the top and having an opening through its side near its upper end, a shield secured to the pipe above, and extending downwardly past, said side opening, a tubular piston having an opening in its top and an open lower end normally engaging said member within said pipe and around the opening from the chamber, the side walls of the pipe and piston lying adjacent to each other, the axial length of the piston being less than the distance from the bottom of the side opening to the top of the pipe, a disc in the piston and movable to close said opening in the top thereof and means in the piston to support the disc remote from the top of the piston and to guide the disc in its movements toward and away from the piston top.

3. A snubber vent for a storage chamber comprising a member defining a top opening from said chamber, a tubular, vertical pipe open at the bottom and resting on said member about said opening, closed at the top and having an opening through its side near its upper end, a tubular piston having an opening in its top and an open lower end normally engaging said member within said pipe and around said opening from the chamber, the inner surface of the pipe and the outer surface of the piston defining therebetween an annular space having a short radial length as compared with its axial length, said surfaces serving by reason of their proximity to each other to guide the piston in its movement lengthwise in the pipe without impeding that movement, a disc in the piston and movable to close said opening in the top thereof and means in the piston to support the disc remote from the top of the piston and to guide the disc in its movements toward and away from the piston top.

4. A snubber vent for a storage chamber comprising a member defining a top opening from said chamber, a vertical pipe open at the bottom and resting on said member about said opening, closed at the top and having an opening through its side near its upper end, an elongated piston having an opening in its top, an open lower end normally engaging said member within said pipe and around said opening from the chamber and its side wall disposed adjacent to the side wall of the pipe for free guided movement lengthwise of the pipe, a disc in the piston and movable to close said opening in the top thereof and plates extending lengthwise and transversely in the piston to support the disc remote from the top of the piston and to guide the disc in its movements toward and away from the piston top.

5. A snubber vent for a storage chamber comprising a member defining a top opening from said chamber, a vertical, sheet metal pipe open at the bottom and resting on said member about said opening, closed at the top and having an opening through its side near its upper end, a sheet metal piston having an opening in its top and an open lower end normally engaging said member within said pipe and around said opening from the chamber, the inner surface of the pipe and the outer surface of the piston defining therebetween an annular space having a short radial length as compared with its axial length, the axial length of the piston being less than the distance from the bottom of the side opening to the top of the pipe, a sheet metal disc in the piston and movable to close said opening in the top thereof and sheet metal plates in the piston to support the disc remote from the top of the piston and to guide the disc in its movements toward and away from the piston top.

References Cited in the file of this patent

UNITED STATES PATENTS

| 349,586 | Glace | Sept. 21, 1886 |
| 637,994 | Klay | Nov. 28, 1899 |
| 936,571 | Schafer et al. | Oct. 12, 1909 |
| 1,415,816 | Edwards | May 9, 1922 |
| 2,022,143 | Mottershall | Nov. 26, 1935 |
| 2,133,200 | Kenneweg | Oct. 11, 1938 |
| 2,273,737 | Snyder | Feb. 17, 1942 |

FOREIGN PATENTS

| 139,633 | Great Britain | Mar. 11, 1920 |